UNITED STATES PATENT OFFICE.

BEVERLY V. BROADDUS, OF BUNCETON, MISSOURI.

IMPROVEMENT IN INSECT-DESTROYING COMPOUNDS.

Specification forming part of Letters Patent No. 154,830, dated September 8, 1874; application filed September 3, 1874.

*To all whom it may concern:*

Be it known that I, BEVERLY V. BROADDUS, of Bunceton, Cooper county, State of Missouri, have discovered and made a composition of certain constituents, whereby to eradicate all parasites which injure and destroy vegetation, and at the same time, with my said compound, fertilize the soil and accelerate the growth of vegetable matter.

My said annihilator of parasites, and fertilizer, consists of water leached through common horse-manure, a decoction of fennel, or "dog fennel," "May-apple" or mandrake, alum, and coal-oil.

The composition is made of the above-named ingredients, and in the following manner:

Leach eighteen gallons of water through about one bushel of horse-manure. Add to this about four gallons of the decoction made from eight ounces of the roots, and their outgrowth, of fennel, and about three gallons of the decoction made from two ounces of the roots of the May-apple or mandrake, and add to these eight ounces of alum, dissolved in half a gallon of hot water and half a gallon of coal-oil. Mix all the ingredients together, and the compound is then ready for use.

The manner of applying my said compound may vary to suit the convenience of the agriculturist and vegetation being injured. When a field is extensive, and the potato tops are being destroyed by the potato-bug, the application can be made by an apparatus similar to the street-watering machine.

The proportions of the articles used in the manufacture of my said invention and discovery may be varied somewhat and still produce good results. I have in this way extensively experimented, and have found the proportions herein given the best for all the uses of my said compound. This compound is not injured by remaining in an open vessel, but remains good and efficient irrespective of time and exposure.

In applying it to wheat-crops the usual street-sprinkler may be used, without injury to the wheat from tramping, after it is about six inches high until two-thirds grown.

For corn and garden vegetables use the ordinary sprinkling-pot or small tin cups.

When the wheat-crop is harvested the chinch-bug leaves the field and will attack the corn nearest by. I have seen the corn black with them, but one application of my discovery causes their permanent absence.

The means adopted for applying my compound may be such as is most convenient for the farmer, who will discriminate in this respect by taking into consideration the parasite and the extent of injury and advanced growth of the crop or vegetation to be treated.

The proportions or quantity of each element or constituent herein stated has resulted in a solution which has never failed but always proved ample for the destruction of all parasites and the rapid growth of all vegetation having been treated with it.

Having thus described the nature of my invention, what I claim therein as new is—

The compound consisting of a decoction of horse-manure, fennel, mandrake, solution of alum, and coal-oil, substantially as and for the purpose herein set forth.

BEVERLY V. BROADDUS.

Witnesses:
 T. A. COOK,
 CHAS. M. MIDDLETON.